US008880056B2

(12) United States Patent
King

(10) Patent No.: US 8,880,056 B2
(45) Date of Patent: Nov. 4, 2014

(54) SYSTEMS AND METHODS FOR MOBILE PHONE VALIDATION

(75) Inventor: James King, Wokingham (GB)

(73) Assignee: Broadcom Corporation, Irvine, CA (US)

( * ) Notice: Subject to any disclaimer, the term of this patent is extended or adjusted under 35 U.S.C. 154(b) by 770 days.

(21) Appl. No.: 11/849,330

(22) Filed: Sep. 3, 2007

(65) Prior Publication Data

US 2009/0061845 A1    Mar. 5, 2009

(51) Int. Cl.
*H04W 24/00* (2009.01)
*H04W 24/06* (2009.01)
*H04W 88/02* (2009.01)

(52) U.S. Cl.
CPC .............. *H04W 24/06* (2013.01); *H04W 88/02* (2013.01)
USPC ............................. 455/423; 455/418; 455/419

(58) Field of Classification Search
USPC ............. 455/423, 67.11, 67.14, 68, 424, 425, 455/418, 419; 370/241, 242; 340/853.2
See application file for complete search history.

(56) References Cited

U.S. PATENT DOCUMENTS

| | | | |
|---|---|---|---|
| 6,680,913 B1 * | 1/2004 | Malmivirta et al. | 370/249 |
| 6,687,500 B1 * | 2/2004 | Causey | 455/423 |
| 6,804,512 B1 * | 10/2004 | Baker et al. | 455/423 |
| 6,856,802 B1 * | 2/2005 | Kinnunen et al. | 455/425 |
| 6,978,131 B1 * | 12/2005 | Lee | 455/423 |
| 2004/0087303 A1 * | 5/2004 | Pugliese | 455/423 |
| 2004/0203726 A1 * | 10/2004 | Wei | 455/423 |
| 2006/0046751 A1 | 3/2006 | Le | |
| 2006/0205397 A1 * | 9/2006 | So et al. | 455/423 |
| 2009/0067367 A1 * | 3/2009 | Buracchini et al. | 370/328 |

FOREIGN PATENT DOCUMENTS

| | | |
|---|---|---|
| GB | 2421813 A | 7/2006 |
| TW | 200412167 | 7/2004 |
| WO | WO-2006/045334 A1 | 5/2006 |

* cited by examiner

*Primary Examiner* — Kwasi Karikari
(74) *Attorney, Agent, or Firm* — McDermott Will & Emery LLP

(57) ABSTRACT

A method for validating the operational characteristics of a mobile phone is provided. The message may include sending a message from the mobile phone to network testing equipment. This message may alert the network testing equipment that a debug state of the mobile phone is enabled. The method may also include sending test data from the network testing equipment to the mobile phone. The method may further include receiving the test data at the mobile phone. The method may yet further include creating a log of received data at the mobile phone. In addition, the method may include using short message service signaling to send at least a portion of the logged data from the mobile phone to the network test equipment.

20 Claims, 6 Drawing Sheets

SYSTEMS AND METHODS FOR MOBILE PHONE VALIDATION

FIELD OF TECHNOLOGY

This invention relates to techniques used to bring a mobile phone from development to the market. More particularly this invention relates to validating modem hardware and a mobile phone software protocol stack for use in the market.

BACKGROUND OF THE INVENTION

Mobile phone antennas typically are used by mobile phones to receive and transmit data. The data may include frame data, encoding data and other relevant data. These data are typically sent using radio signals. These data typically control the radio hardware in the phone and are the vehicles by which the phone talks to the base stations.

Generally, this data is received and transmitted using typical hardware and specialized software to convert the data into a radio signal and transmit the data as a radio signal. The form of these data evolves over time. One reason for the near-constant flux in the formatting of the data is that standards bodies are constantly standardizing increases in speed and power efficiency in mobile phones and other related devices.

When changes are made to the software protocol stack—i.e., the software that allows the phone to receive and transmit signals, as well as convert digital signals to analog signals and vice versa—the updated protocol stack must be continually validated with different providers of base stations. This validation preferably maintains the quality of transmission of the mobile phone. For example, when a known system such as HSDPA[1] (High Speed Data Packet Access) is added to the protocol stack, the phone manufacturer must ensure that the phone continues to work with base stations that are not HSDPA compliant.

[1] High Speed Downlink Packet Access—HSDPA improves system capacity and increases user data rates in the downlink direction, that is, transmission from the Radio Access Network to the mobile terminal.

There are three main sets of testing that a mobile phone undergoes before release to market—GCF Testing—Global Certification Forum testing, that proves that the phone works with present standards, RRM Testing—Radio Resource Management which has been added by equipment manufacturers to ensure the mobile phone works in a practical setting, and IOT Testing—Interoperability testing which is provided by network equipment manufacturers to ensure that new modems in mobile phones will operate correctly with their network equipment. Passing these tests forms a large part of improving a protocol stack's performance.

Typically, networking testing equipment is used to simulate conditions for testing mobile phones. Once the simulated tests are passed, field testing may be done. Field testing typically requires live network testing whereby the phone is tested in various scenarios against the network operator's live equipment.

Certain operations such as making a phone call from a mobile phone are typically easy to implement and, accordingly, the tests are usually passed. However, tests related to other aspects of mobile phone operation such as switching over from one cell to another, power control of the mobile phone, etc. are not as easily passed.

This testing is done for virtually every new mobile phone that is produced. Yet, when there is a test failure it typically requires an expert to be available to diagnose and "debug"—i.e., determine and correct the source of—the problem.

In order to help the expert debug the phone, the mobile phone typically produces logging data in a proprietary format which is then output normally over a UART or USB to a proprietary logging application. The network equipment will produce logging data again in a format proprietary to the equipment manufacturer. It is then required for the expert to try and align this logging output and determine where the phone failed the test. Further when doing live network testing, it is rare that the logging from the network equipment is available. In such circumstances, the expert typically is required to debug the phone just using information available from the phone itself.

In one example of a conventional test, when the network equipment sends a "reduce power" signal to the mobile phone, perhaps to conserve power consumption in the mobile phone, this command can be logged at the network equipment side. Thus, the network equipment side will know that it sent the message, but the network equipment will not know how the message was interpreted by the mobile phone other than, possibly, information relating to the power measurement coming from the phone.

These problems and other problems are present in conventional systems and methods for bringing a mobile phone to market.

It would be desirable to directly transmit messages from the mobile phone to the network testing equipment in order to more closely monitor the mobile phone's reaction to simulated test data.

SUMMARY OF THE INVENTION

A system and/or method for validating the operation of a mobile phone protocol stack and modem, substantially as shown in and/or described in connection with at least one of the figures, as set forth more completely in the claims.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
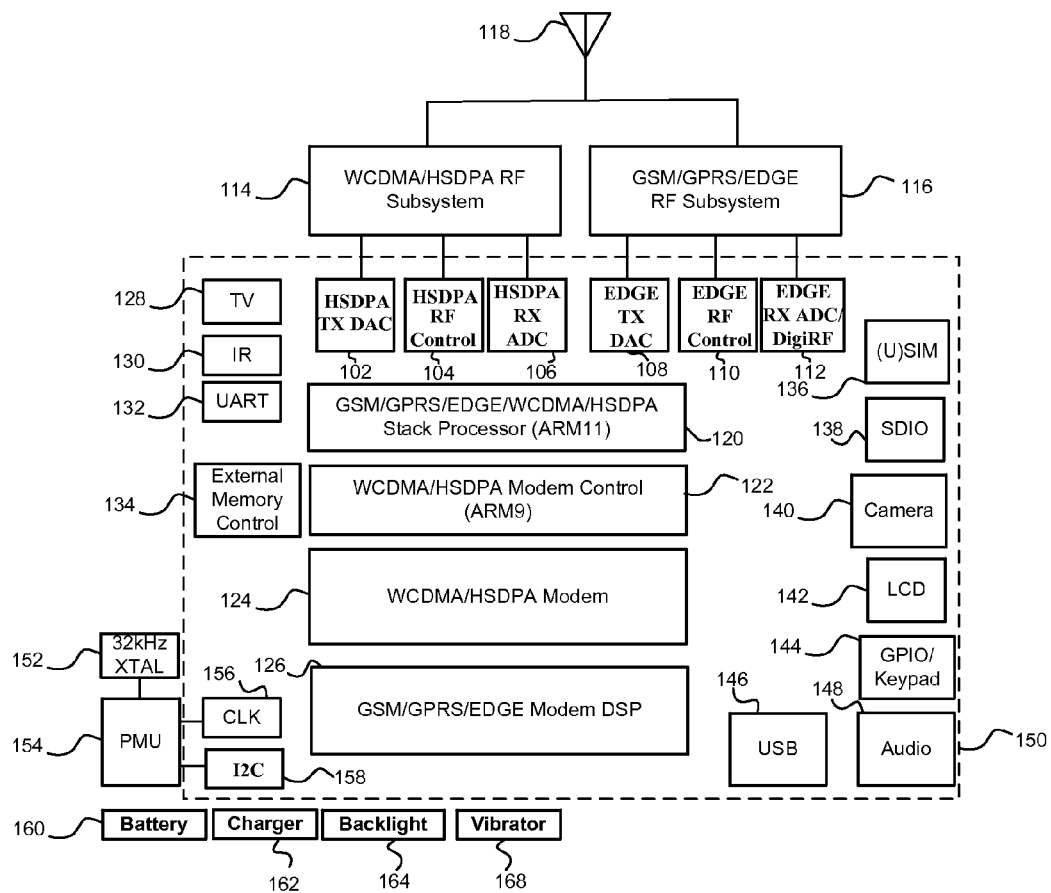
FIG. 1 shows a schematic diagram of a conventional cell phone.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

A solution according to the invention to the problems stated above may require that one or more basic telephony features such as making a simple voice call and transferring SMS (short message service) messages are typically operational at the time the phone is being tested. When basic telephony and SMS messaging are available, then, in a method according to the invention, the phone can pass logging information to the network equipment and vice versa using the air interface. More particularly, this description focuses on using special SMS text messages for exchanging logging information between the phone and the network equipment. Ultimately, both logging information from the phone and logging information from the network testing equipment can be forwarded to a single terminal for further analysis.

Typically, every tenth of a second, a signal gets sent from the mobile phone to the base station. This signal may include about 200 bytes of information. This signal typically includes the bytes in which the SMS signal is transmitted. In a method according to the invention this SMS portion of the signal can be used for transmitting debugging information from the mobile phone to the network testing equipment.

The format of the SMS messages according to the invention can form part of an industry standards such that the information can be analyzed and used in connection with different products. An exemplary implementation of the format is to have the feature only enabled via the phone's engineering menu and to identify the debug SMS messages with a special non-ASCII character escape sequence or any other suitable sequence. The escape sequence may communicate to the network testing equipment a message along the lines of, "please look at me because I carry debugging information."

Accordingly, the data can be passed as data pairs with an identifier code followed by the data value. An example of such an SMS debug message may be:

00 01 02 03 10 00 00 00 80 15 00 01 07 00

Where '00 01 02 03' is the escape sequence, '10' is the code for RSSI[2] measurement, '00 00 00 80' refers to –80 dBm, '15' is the code for UARFCN[3] and '00 01 07 00' refers to 10700. What this would be saying to the network equipment is that the phone measured its signal at –80 dBm when scanning at UARFCN frequency 10700.

[2] Received Signal Strength Indication. RSSI is a measurement of the received radio signal strength. RSSI is a generic radio receiver technology metric, which usually is invisible to the user of device containing the receiver, but may be directly known to users of wireless networking of IEEE 802.11 protocol family.
[3] UTRA Absolute Radio Frequency Channel Number. The Channel (UARFCN) Information screen is a tool to help identify what channels the test set is currently using (generating in the downlink or tuned to in the uplink), and in what band it is currently operating.

Other information that could be passed over this interface related to the radio signal are power measurements, block error rates, TFCI[4] quality, etc. In addition, the mobile phone could pass logs of inter-layer messages to show what signals the mobile phone had received from the network equipment and what actions the mobile phone was taking with the received messages.

[4] This is a representation of the current TFC (Transport Format Combination) being used. The TFCI is transferred across the air interface and allows the receiving layers to identify the current valid Transport Format Combination and hence, how to decode, de-multiplex and deliver the received data on the appropriate Transport Channels.

Figure 4:
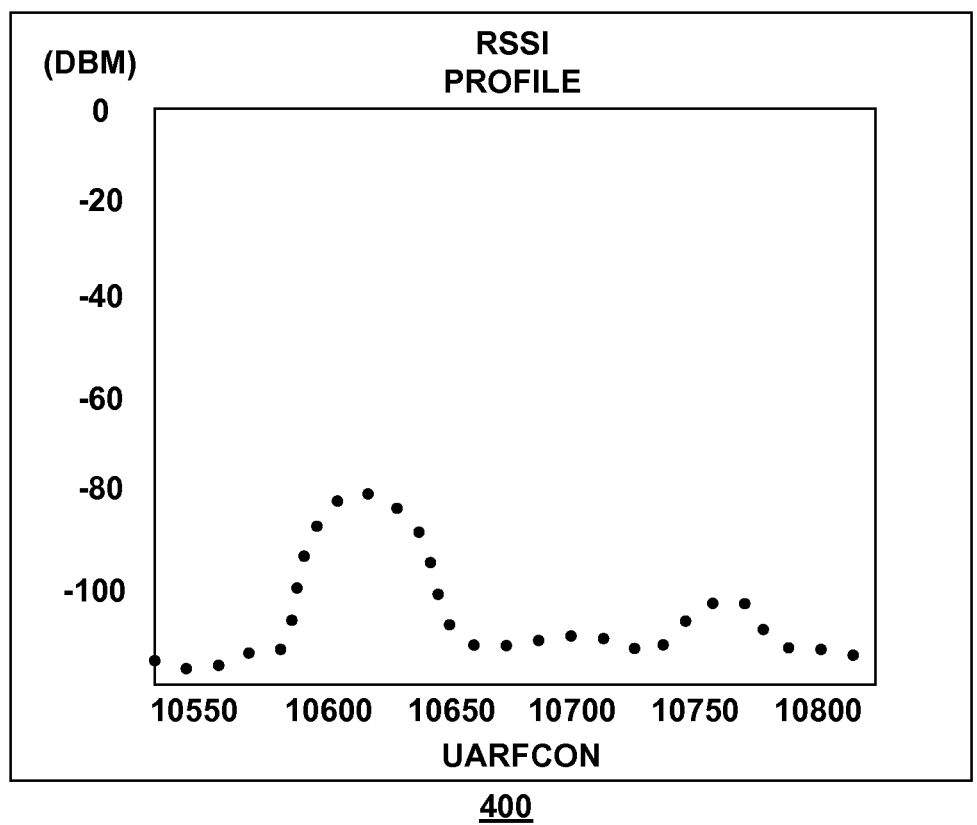
FIG. 4 shows an exemplary RSSI test result.

In an exemplary test according to the invention, the messages passed between the mobile phone and the network testing equipment could be something like those shown and described in the sequence diagram illustrated in FIG. 4.

In one embodiment of the invention, the state of debugging the phone over the air interface may be entitled "phone debug enabled." Phone debug enabled can be implemented via the phone's engineering menu. In one such implementation, this feature may be selectively enabled—i.e., the feature is only enabled at certain times. Preferably, in all cases the messages being passed are using the SMS mechanism and may commence with the appropriate escape sequence.

In a further embodiment of the invention, a "debug capabilities list" may be a list of the debugging message codes supported by the phone. In certain embodiments of the invention, far more debug information may be available from the phone than can be transported over SMS messages during a test. Consequently, the network equipment may be required to request the appropriate data relevant to a test.

By using the data reported from the phone, it may be possible to improve the test scripts for the interoperability testing and conformance testing which run on the test network equipment. For example, these test scripts according to the invention could run and check the response of the phone by asking for the appropriate debug data. For example, adjusting the "transmit signal strength" and asking the phone to report the signal strength the phone measured before, during and after the adjustment, may help spot potential problems.

The tests can, upon failure of such tests, be automated to repeat the same test several times. During the iterations of the tests, the network test equipment can collect debug information from the phone. Such debug information may include the inter-layer messages. In certain embodiments of the invention, such information may also include automated diagnosis of the reasons for the test failure. The pertinent logs—i.e., the phone logs and the network equipment logs—can also be recorded and displayed together. Such a simultaneous display may aid the diagnosis of faults where the network equipment and the phone fallen out of synch. Such a condition may be difficult to observe from separate logs.

Further, the exchanged information, when viewed by the network operators in the field, may be used to automate the process of monitoring and managing the network. By enabling this feature on a sample of phones in their network, the network operators can request back information regarding the cells seen by the phone and the signal strengths of the respective cells to help automate network planning.

It should be noted that systems and methods according to the invention may pertain to testing of equipment using GSM[5], GPRS[6] and UMTS[7] or any other suitable mobile phone protocols.

[5] The Global System for Mobile communications is a second generation cellular telecommunication system which was first planned in the early 1980s. Unlike first generation systems operating at the time, GSM was digital and thus introduced greater enhancements such as security, capacity, quality and the ability to support integrated services.
[6] General Packet Radio Service is defined by 3GPP (Third Generation Partnership Project) and is employed to connect mobile cellular users to PDN (Public Data Network). Within the GSM network it shares the network databases and radio access network and employees functions known as the PCU (Packet Control Unit), SGSN (Serving GPRS Support Node) and GGSN (Gateway GPRS Support Node) to provide packet switching data services across the fixed and radio network.
[7] UMTS—Universal Mobile Telecommunications System—A 3G mobile communications system which provides an enhanced range of multimedia services. UMTS will speed convergence between telecommunications, IT (Information technology), media and content industries to deliver new services and create fresh revenue generating opportunities.

Systems and methods according to the invention that provide for the simultaneous aggregation and/or display of actual logging data and/or debugging data from the mobile phone and the network equipment may obtain at least the following advantages. The systems and methods may preferably obtain unified logs of what happened at both ends of the test (what the network equipment sent and what the mobile phone received)—particularly in the case of a test failure. Furthermore, automated analysis of log output to diagnose a fault, with the possibility of automated corrections to resolve it in the field, may also be implemented. Automated monitoring by the network testing equipment of what the phone believes it is seeing from the network equipment may also be implemented. One purpose of such an implementation is to verify that the network is operating as expected. Another purpose of such an implementation may be to help with network planning.

Test providers may further enhance the tests to determine common test failure reasons.

A method for implementing a system according to the invention may include the step of using the phone to transmit debugging information to the network equipment using SMS text messages. The same, or other suitable protocol, could be used to transmit similar information from the network equipment to the phone if the phone was required to resolve a debugging issue or to help optimize the system.

The test data need not be limited to transfer via SMS. In certain embodiments of the invention, for example, the test data could be sent via GSM, GPRS or UMTS calls between the phone and the network equipment. These alternate types of transmissions may be very useful for encoding debug information into the audio of a voice call. Consequently, a relatively large amount of debug information can be passed between the phone and network equipment without any extra signaling.

In addition, the data and its formatting may not be limited to mobile phone protocols, but could be extended to other wireless interfaces such as WiFi and Bluetooth, albeit with some different parameters to be obtained from the devices.

FIG. 1 shows a schematic diagram of a cell phone 150 that could be used for systems and methods according to the invention. Cell phone 150 preferably include components HSDPA Transmitter DAC 102, HSDPA RF Control 104, HSDPA RX ADC 106, EDGE[8] TX DAC 108, EDGE RF Control 110, and EDG RX ADC/DigiRF 112 (each of which forms a portion the hardware for converting the digital signal from the modem to an analogue RF signal for the antenna and vice-versa). WCDMA[9]/HSDPA RF subsystem 114, GSM/GPRS/EDGE subsystem 116, and antenna 118 are for establishing a connection between the phone and the cell.

[8] Enhanced Data rates for Global Evolution—EDGE uses the same spectrum allocated for GSM900, GSM1800 and GSM1900 operation. Instead of employing GMSK (Gaussian Minimum Shift Keying) EDGE uses 8PSK (8 Phase Shift Keying) producing a 3-bit word for every change in carrier phase. This effectively triples the data rate offered by GSM. The use of EDGE enables GSM to increase the data rates that can be offered to users of the GSM spectrum.
[9] WCDMA—Wideband Code Division Multiple Access—An ITU (International Telecommunications Union) standard derived from CDMA (Code Division Multiple Access) technology.

Components GSM/GPRS/EDGE/WCDMA/HSDPA Stack Processor (ARM11) 120 (which is the baseband processor for the phone), WCDMA/HSDPA Modem control (ARM9) 122, WCDMA/HSDPA Modem 124 and GSM/GPRS/EDGE Modem DSP 126 are the core processing logic and further contain relevant mobile phone communications protocols.

Finally, components TV 128, IR (Infrared) 130, UART 132 (Universal Asynchronous Receiver/Transmitter—i.e., hardware that translates data between parallel and serial interfaces) external memory control 134, (U)SIM[10] 136, SDIO (Secure Digital Input/Output (SDIO) is a standard for devices that feature interchangeable memory options) 138, camera 140, LCD 142, GPIO/Keypad 144, USB interface 146, and audio 148 are all for connections to phone peripherals. 32 kHz XTAL 152 (an oscillator that uses a quartz crystal to generate a frequency) is coupled to PMU (Power Management Unit) which is, in turn, coupled to CLK (Clock) 156 and 12C Bus 158. Furthermore, battery 160, charger 162, backlight 164, and vibrator 168 (or other tactile feedback) are shown schematically for further illustration.

[10] USIM—UMTS Subscriber Identity Module Usually referred to as a SIM card, the USIM (UMTS Subscriber Identity Module) is the user subscription to the UMTS mobile network. The USIM contains relevant information that enables access onto the subscribed operator's network.

Figure 2:
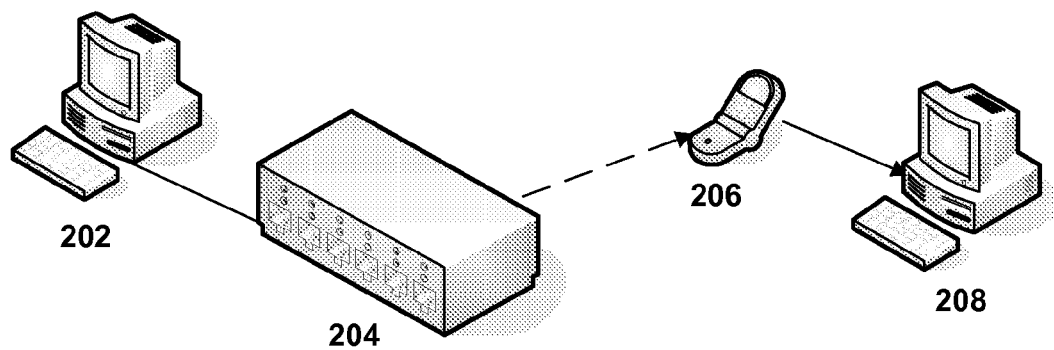
FIG. 2 shows a conventional system for testing wireless phone hardware.

FIG. 2 shows a schematic diagram of a conventional test system showing the two separate terminals used to diagnose problems. The system may operate as follows: Network test equipment 204 typically sends test data to mobile phone 206. Thereafter, terminal 202 typically receives the logged test data from network test equipment 204 and records the data. Terminal 208 typically receives the data from mobile phone 206 and records the data. Then, an expert typically compares the logged data stored in terminal 202 with the logged data stored in terminal 208 and obtains information about the test.

Figure 3:
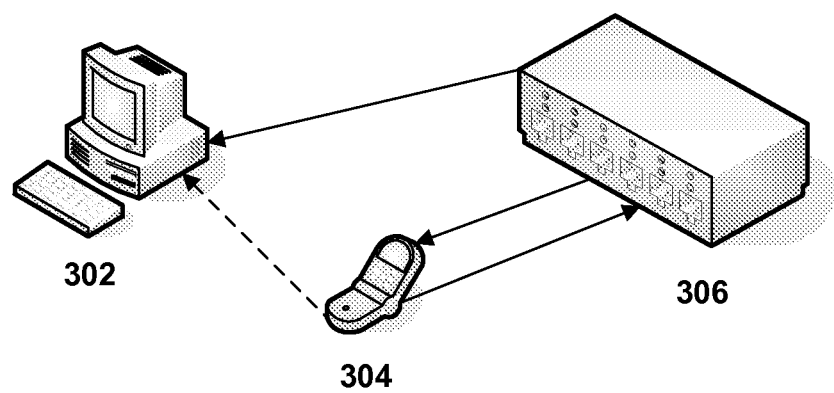
FIG. 3 shows a system according to the invention for testing wireless phone hardware.

FIG. 3 shows a system according to the invention. Specifically, terminal 302 generates test data and transmits the data to network test equipment 306. (In alternate embodiments of the invention, the network testing equipment itself may generate the test data). Thereafter, network test equipment 306 sends the test data from terminal 302 (or its own generated test data) to mobile phone 304. Mobile phone 304 then communicates the log information from the test results back to network equipment 306 which, in turn, sends both the network equipment logged data and the mobile phone logged data back to terminal 302 for further comparison and analysis. A dotted line is shown coupling mobile phone 304 to terminal 302 to indicate that mobile phone 304 may optionally send information directly to terminal 302 rather than via network equipment 306.

FIG. 4 shows an exemplary RSSI test result 400. Test result 400 shows a peak at 10600 UARFCN and a smaller peak at 10750. This result indicates that cell signals are available, and strongest at these two peaks. Such a result may be used in systems and methods according to the invention (referring to FIG. 3's elements) as follows. If the network test equipment 306 sends out such a result to the mobile phone 304, mobile phone 304 can then transmit the signals that it received over, for example, SMS messaging back to network test equipment 306. Then, network test equipment 306 can preferably send both sets of logged data back to terminal 302 for comparison.

In an embodiment of the invention (not shown), both the phone and the network equipment may preferably send their respective log data back to a central repository such as a central terminal and the comparison can occur there. For such an embodiment the central terminal would be required to include equipment that could receive signals from the mobile phone and the network test equipment.

In other embodiments of the invention, the network testing equipment could also test whether the mobile phone was measuring cell signals correctly, as well as other parameters including, but not limited to TFCI—Transport Format Combination Indication, ECC—error correction formula which relates to a form of parity bits or other parameters. In such embodiments of the invention that test ECC, the testing equipment may not know the error rate at the phone. The network equipment may be able, according to the invention, to identify systematic errors. For example, network equipment may be able to determine whether systematic errors are occurring in the phone at the end of packets.

Figure 5:
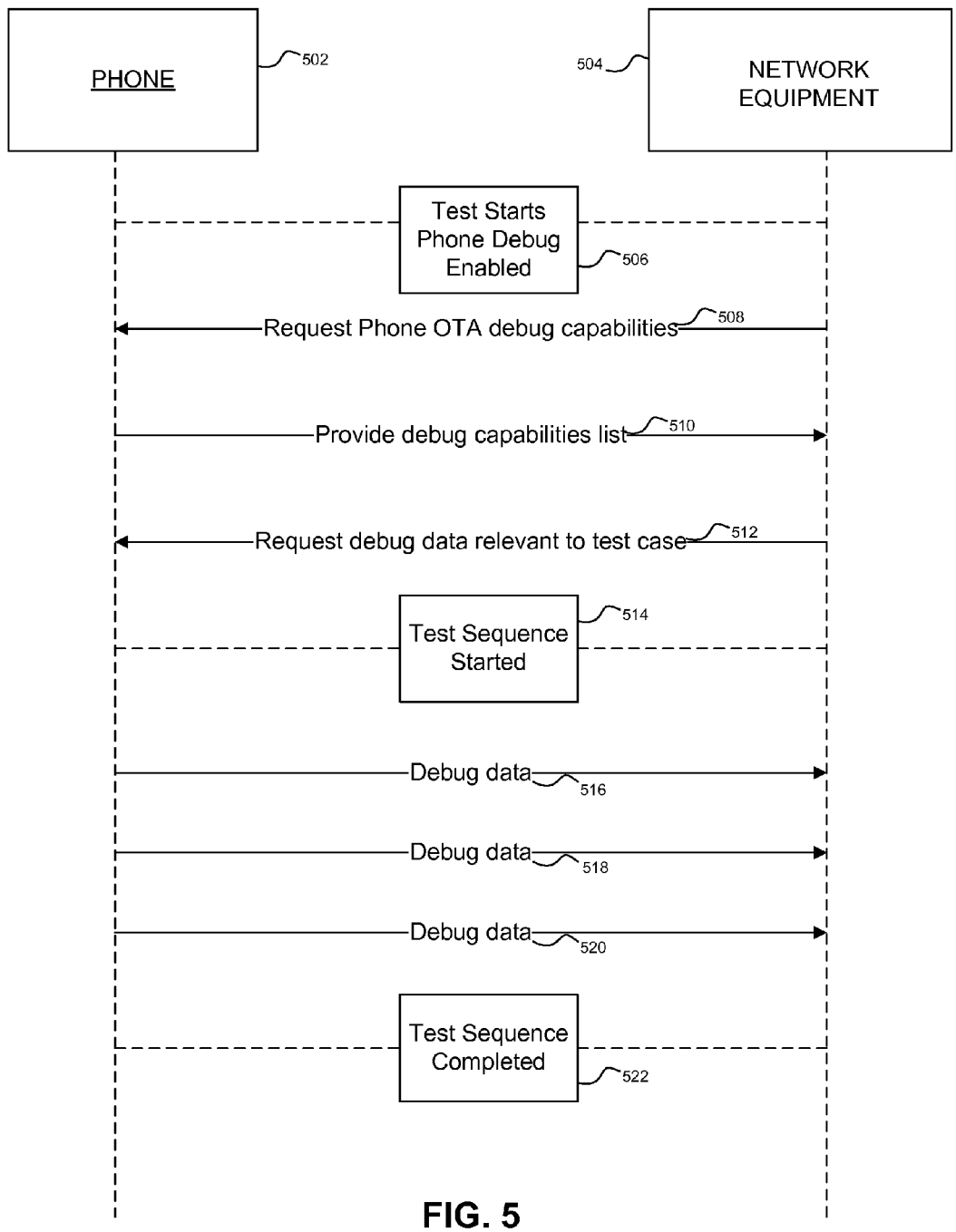
FIG. 5 shows a system, and method for using such system, according to the invention.

FIG. 5 shows a system, and method for using such system, according to the invention. The system preferably includes a mobile phone 502 and network test equipment 504. The method may preferably be used to verify the operational characteristics of mobile phone 502, as set forth in more detail below.

A method according to the invention preferably commences when the phone debug enabled is sent either from the phone to the network equipment or vice versa. The method may also include step 508 wherein the network equipment queries the phone regarding the phones OTA (over the air) debug capabilities.

Thereafter, phone 502 may provide "a debug capabilities list" to network equipment 504, as shown in step 510. Then, in certain embodiments of the invention, network equipment 504 may further query debug data relevant to the case about to be tested, as shown in step 512. Thereafter, step 514 may show that the test sequence is started.

Steps 516, 518, and 520 show debug data being transmitted directly from phone 502 to network equipment 504 during the test. Finally, step 522 shows a completion of the test sequence.

Figure 6:
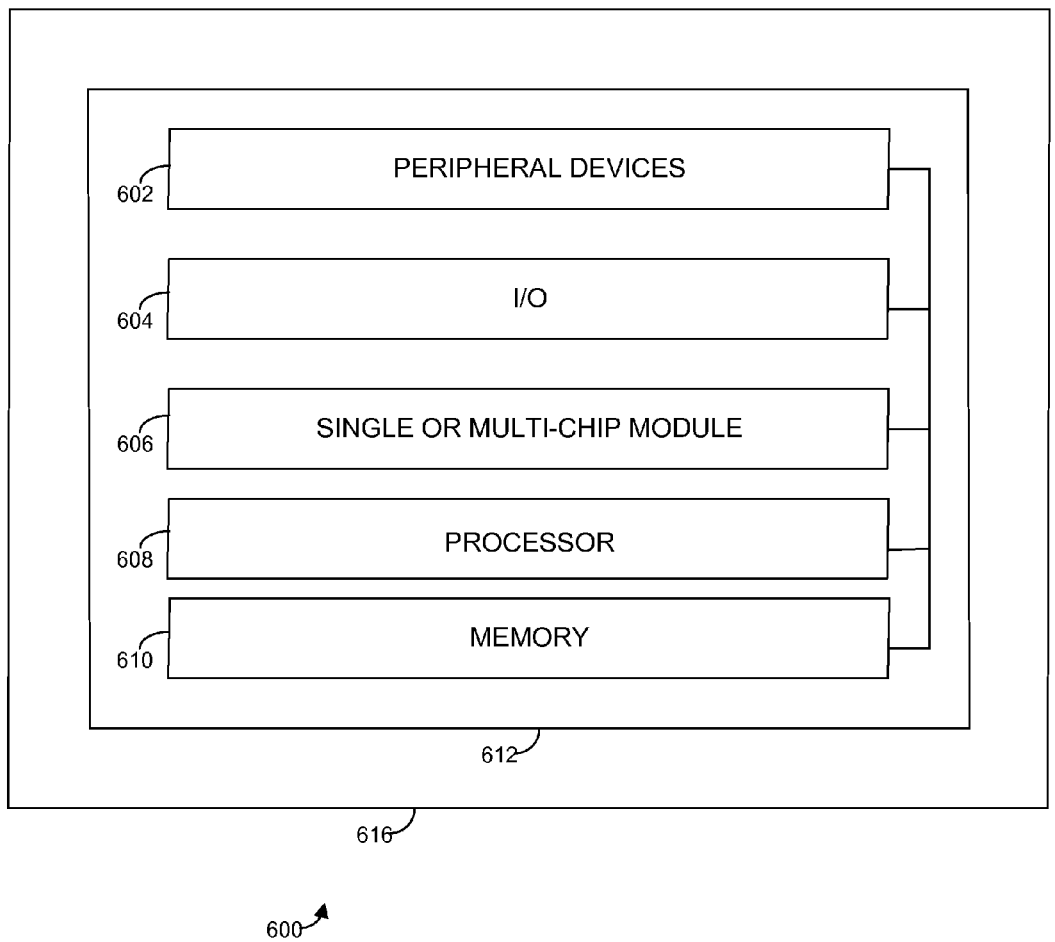
FIG. 6 shows a schematic diagram of an illustrative single or multi-chip module of this invention in a data processing system.

FIG. 6 shows a single or multi-chip module 606 according to the invention, which can be one or more integrated circuits, in an illustrative data processing system 600 according to the invention. Data processing system 600 may include one or more of the following components: I/O circuitry 604, peripheral devices 602, a processor 608 and memory 610. These components are coupled together by a system bus or other interconnections 612 and are populated on a circuit board 616 which is contained in an end-user system 600. System 600 is configured for use in a mobile phone according to the invention. It should be noted that system 600 is only exemplary, and that the true scope and spirit of the invention should be indicated by the following claims.

Aspects of the invention have been described in terms of illustrative embodiments thereof. A person having ordinary skill in the art will appreciate that numerous additional embodiments, modifications, and variations may exist that remain within the scope and spirit of the appended claims. For example, one of ordinary skill in the art will appreciate that the steps illustrated in the figures may be performed in other than the recited order and that one or more steps illustrated may be optional.

Thus, systems and methods for validating a mobile phone have been described. Persons skilled in the art will appreciate that the present invention can be practiced by other than the described embodiments, which are presented for purposes of illustration rather than of limitation, and the present invention is limited only by the claims which follow.

What is claimed is:

1. A method for validating operational characteristics of a mobile phone, the method comprising:
   sending a message from the mobile phone to network testing equipment, the message having an indication that the mobile phone is in a debug state;
   receiving test data from the network testing equipment, the test data comprising information relating to measuring a power control response of the mobile phone;
   generating, by the mobile phone, a log of inter-layer messages describing actions taken by the mobile phone in response to the test data; and
   transmitting at least a portion of the log of inter-layer messages from the mobile phone to the network test equipment via short message service signaling.

2. The method of claim 1 further comprising receiving, by the mobile phone, a message from the network equipment including a request for over the air debug capabilities of the mobile phone.

3. The method of claim 2 further comprising transmitting a debug capabilities list from the mobile phone to the network testing equipment.

4. The method of claim 3, wherein the test data is based at least on the debug capabilities list.

5. The method of claim 1 further comprising receiving, by the mobile phone, from the network equipment a request for at least a portion of the log of inter-layer messages.

6. The method of claim 1 further comprising receiving, by the mobile phone, a request from the network equipment for data relating to whether the mobile phone measures cellular signals correctly.

7. The method of claim 1 further comprising receiving, by the mobile phone, a request from the network equipment for information relating to error correction.

8. A system for wireless coupling to network testing equipment comprising:
   a non-transitory computer readable medium comprising:
      a first instruction code that, when executed, causes a computer to transmit a debug enable signal to the network testing equipment;
      a second instruction code that, when executed, causes a computer to receive data from the network testing equipment, the data being received from the network testing equipment in response to the debug enable signal transmitted to the network testing equipment, the data comprising information relating to measuring a power control response of the system;
      a third instruction code that, when executed, causes a computer to generate a log of inter-layer messages of the system, the inter-layer messages describing actions taken by the system in response to the data received from the network testing equipment; and
      a fourth instruction code that, when executed, causes a computer to transmit at least a portion of the log of inter-layer messages to the network testing equipment via at least one of a text message or a voice call.

9. The system of claim 8, wherein the fourth instruction code, when executed, causes a computer to transmit the log of inter-layer messages to the network testing equipment via at least one of a text message or a voice call.

10. The system of claim 8, wherein the fourth instruction code, when executed, causes a computer to transmit the at least a portion of the log of inter-layer messages via short message service signaling.

11. The system of claim 8, wherein the non-transitory computer readable medium comprises a fifth instruction code that, when executed, causes a computer to receive a request from the network testing equipment for over the air debug capabilities of the system.

12. The system of claim 8, wherein the non-transitory computer readable medium comprises a fifth instruction code that, when executed, causes a computer to transmit a debug capabilities list to the network testing equipment.

13. The system of claim 12, wherein the data is based at least on the debug capabilities list.

14. A method for validating operational characteristics of a mobile phone, the method comprising:
   receiving, by the network testing equipment, a message from the mobile phone, the message having an indication that a debug state of the mobile phone is enabled;
   transmitting test data from the network testing equipment to the mobile phone, the test data comprising information relating to measuring a power control response of the mobile phone; and
   receiving at least a portion of a log of inter-layer messages associated with the mobile phone via at least one of a text message or a voice call, the inter-layer messages describing actions taken by the mobile phone in response to the transmitted test data.

15. The method of claim 14 wherein receiving the at least a portion of the log of inter-layer messages comprises receiving short message service signaling.

16. The method of claim 14 wherein transmitting the test data comprises transmitting a command to the mobile phone.

17. The method of claim 14, further comprising transmitting a request from the network testing equipment to the mobile phone for over the air debug capabilities of the mobile phone.

18. The method of claim 14, further comprising receiving, by the network testing equipment, a debug capabilities list from the mobile phone.

19. The method of claim 18, wherein the test data is based at least on the debug capabilities list.

20. The method of claim 14, further comprising recording the at least a portion of the log of inter-layer messages and a log of the test data.

* * * * *